Patented Jan. 2, 1923.

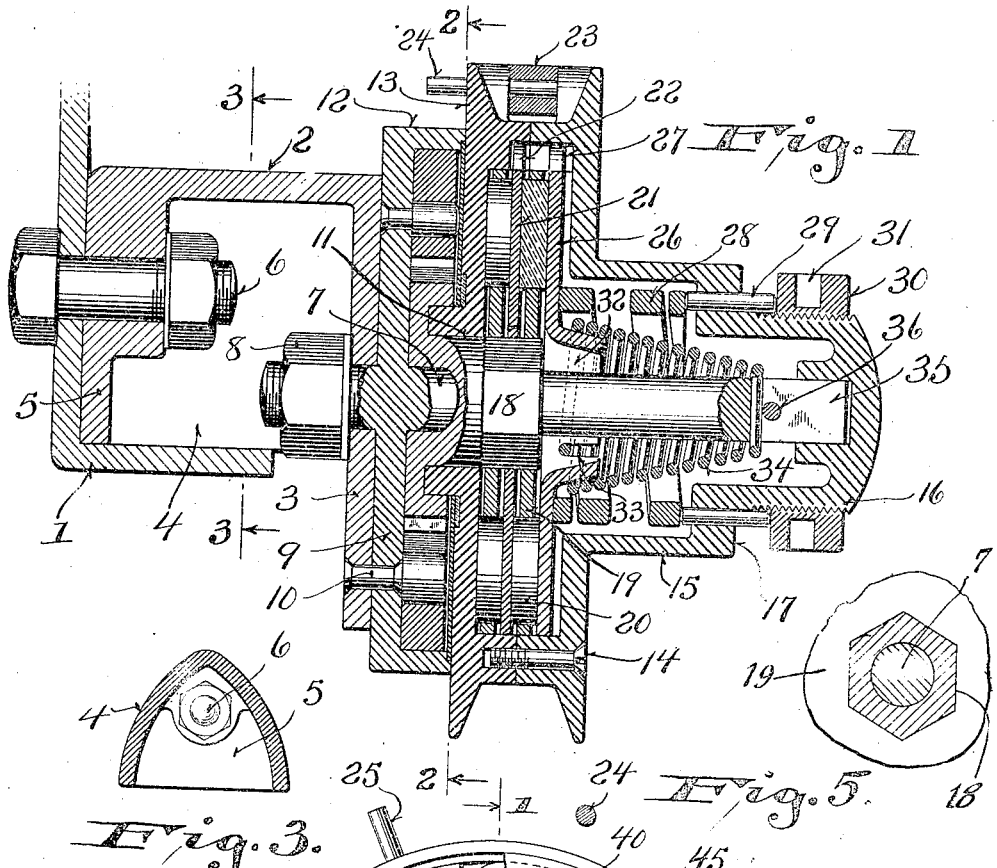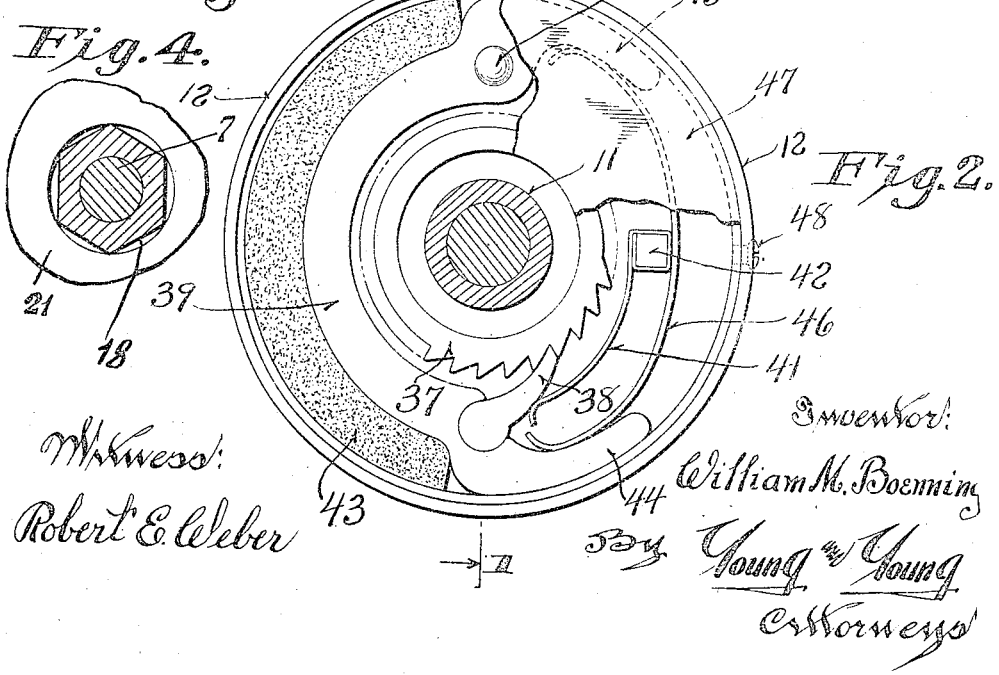

1,440,905

UNITED STATES PATENT OFFICE.

WILLIAM M. BOENNING, OF MANITOWOC, WISCONSIN.

VEHICLE SHOCK ABSORBER.

Application filed October 12, 1921. Serial No. 507,395.

*To all whom it may concern:*

Be it known that I, WILLIAM M. BOENNING, a citizen of the United States, and resident of Manitowoc, in the county of Manitowoc and State of Wisconsin, have invented certain new and useful Improvements in Vehicle Shock Absorbers; and I do hereby declare that the following is a full, clear, and exact description thereof.

My invention relates to new and useful improvements in shock absorbers such as are customarily used on motor vehicles and is more particularly an improvement on the structure shown in my former Patent #1386759, dated Aug. 9, 1921.

One of the important objects of the invention is to provide improved and more easily accessible means for adjusting the amount of friction between the elements which take up the shock.

It is also an object of the invention to improve the working parts of the anti-rattling devices whereby the same are rendered more flexible in their operation as well as being practically noiseless.

A still further object of the invention is to simplify and otherwise improve the means by which the device is attached to the frame of the vehicle.

The invention also includes other minor improvements and combinations which will be hereinafter particularly set forth and subsequently claimed.

In the accompanying drawing:—

Figure 1 represents a longitudinal sectional view through the working parts of the shock absorber and the means by which it is attached to the frame.

Figure 2 is a transverse sectional view taken substantially on the line 2—2 of Figure 1, and Figure 3 is a sectional view taken on the line 3—3 of Figure 1.

Figure 4 is a sectional view showing a friction plate on the sleeve.

Figure 5 is a sectional view showing a disk on the sleeve.

Referring more particularly to the drawing the numeral 1 designates a fragment of the frame bar of a motor vehicle and the numeral 2 designates generally the attaching bracket having a vertical plate 3 to which the shock absorber is secured. The bracket also includes a laterally extending portion 4 which in cross section is substantially in the shape of an inverted V and is closed at its outer end by a triangular web 5, the base of which rests on the horizontal portion of the frame bar. Thus the bracket may be firmly secured as shown in Figure 1 by a single bolt 6.

The working parts of the shock absorber are supported on a shaft 7 which extends horizontally from the vertical portion 3 of the bracket and is secured thereto by a nut 8 threaded onto the end of the shaft. Integral with the shaft or firmly secured thereto is a plate 9 which rests against the bracket portion 3 and is further secured thereto by a rivet 10 or other suitable means to prevent rotation of the same about the shaft 7. A sleeve 11 is journaled on the shaft adjacent the plate 9, the latter being provided with a peripheral flange 12 adjacent to which is a casing 13 which is journaled at one side on the sleeve and at its other side is journaled on the end of the shaft. The casing consists of two parts which may be held together by screws 14 or the like. An outwardly extending cylindrical portion 15 is provided with a reduced end 16 which receives the end of the shaft and is connected to the cylindrical portion by a shoulder 17 which is provided for a purpose which will hereafter appear.

The sleeve 11 has a non-circular portion 18 within the casing to which are keyed a number of discs 19, in the present instance two, within which are received a series of friction elements 20 which engage a friction plate 21, the latter being loosely mounted on the sleeve and keyed to the outer wall of the casing as shown at 22. A flexible cable or chain 23 is secured to the periphery of the casing and is wound partially about the same and connected with the vehicle spring in a manner similar to that shown in my above mentioned patent.

When the body of the vehicle settles under a sudden load the chain 23 will become slack and permits the sleeve and casing to be rotated about the shaft by means hereinafter described, thus taking up the slack in the chain. The casing 13 is preferably provided with a stop 24 which engages a stop 25 on the flange 12 to limit the rotation of the casing under these circumstances. When the body of the vehicle rebounds the casing 13 is rotated by the chain but the sleeve and discs 19 are held against rotation in this direction by means hereinafter described so that the friction between the disc 21 and the elements 20 will be exerted to retard and limit the rebound.

A plate 26 is disposed in engagement with one set of friction elements 20 and keyed at 27 to the casing. A coil expansile spring 28 engages the face of the plate to force the same into engagement with the friction elements. For the purpose of adjusting the tension of the spring thereby regulating the amount of friction, pins 29 extend through the above mentioned shoulder 17 engaging the outer end of the spring and are adjusted by means of a collar 30 threaded to the outer portion 16 of the casing and provided with suitable means 31 for receiving an adjusting tool. The plate 26 is also provided with a boss 32 extending around the shaft 7 and having a slot 33 which receives the end of a coil spring 34, the other end of the spring being inserted in the split end 35 of the shaft and secured by a pin 36. The spring 34 exerts a torsional force to rotate the discs and sleeve upon depression of the vehicle body as above set forth. Integral with or secured to the inner end of the sleeve 11 is a ratchet wheel 37 with which cooperates a pawl 38 carried on the end of a curved lever 39 which is pivoted at 40 to the plate 9. The pawl is normally held in engagement with the teeth of the ratchet by means of a leaf spring 41 which is carried by a stud 42 secured to the plate 9. When the casing 13 is rotated therefore by the chain 23 the ratchet wheel and sleeve will be held against rotation by the pawl. The lever and pawl however are yieldable to a certain extent against a cushion 43 which extends between the convex side of the lever and the flange 12. The ends of the lever 44 and 45 extend tangentially of the flange and permit a certain amount of movement of the lever. When the body of the vehicle rebounds therefore, the sudden jerk exerted by the chain will be transmitted through the friction elements and the ratchet wheel of the lever but the force of the same will be absorbed partly by the friction elements and partly by the cushion 43, thus making the action of the shock absorber smooth and noiseless. The action of the lever 39 is also retarded by a spring 46 which acts between the ends thereof and the stud 42. The smooth and noiseless operation of the device is also assisted by filling the space enclosed by the flange 12 with grease, the same being retained by a plate 47 which may be spot welded thereto. A plug 48 is provided for inserting the grease.

It will be seen that the improved structure of the lever 39 and the parts in combination therewith will result in a particularly smooth and easy working of the device. The friction between the elements within the casing 13 may be very readily adjusted by means of the collar 30 which is readily accessible. The device may also very easily be attached to the vehicle by means of a single bolt 6, it being necessary only to drill a single hole in the frame of the vehicle.

I claim as my invention:—

1. In a device of the character described, a relatively stationary shaft, a casing rotatably mounted on said shaft, a sleeve journaled on said shaft but held against rotation in one direction, a plurality of friction elements within the casing, acting between the same and the sleeve, said casing having an outwardly extending cylindrical portion with its outer end reduced to form an annular shoulder, an expansile spring between the shoulder and friction elements for urging the latter into engagement, a collar threaded onto said reduced portion, and pins acting between the spring and collar for adjusting the amount of friction by rotation of the collar.

2. In a device of the character described, a relatively stationary shaft, a casing rotatably mounted on said shaft, a sleeve journaled on said shaft but held against rotation in one direction, a stop for limiting the rotation of the casing in the opposite direction, a plurality of friction elements certain of which are keyed to the casing and the remainder keyed to the sleeve, a plate for pressing the friction elements into engagement, an expansile spring adjustably engaging the plate, said plate having a laterally extending boss, a slot in said boss, a slot in the outer end of the shaft, a torsional spring surrounding the boss and shaft and having its ends inserted in the respective slots, and a pin extending through the shaft transversely to its slot to retain said last named spring in active position.

3. In a device of the character described, a relatively stationary shaft, a casing rotatably mounted on said shaft, a sleeve journaled on said shaft but held against rotation in one direction, a plurality of friction elements within the casing acting between the same and the sleeve, a bracket secured to said casing, said bracket having a laterally extending portion substantially V-shaped in cross section, and a vertical web closing the outer end of said laterally extending portion for attachment to an angle iron.

In testimony that I claim the foregoing I have hereunto set my hand at Manitowoc, in the county of Manitowoc and State of Wisconsin.

WILLIAM M. BOENNING.